US008244839B2

(12) United States Patent
Beaty et al.

(10) Patent No.: US 8,244,839 B2
(45) Date of Patent: Aug. 14, 2012

(54) NETWORK PROBLEM DETERMINATION

(75) Inventors: Kirk A. Beaty, Goldens Bridge, NY (US); Michael R. Head, Tarrytown, NY (US); Anca Sailer, Scarsdale, NY (US); Hidayatullah Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/826,915

(22) Filed: Jun. 30, 2010

(65) Prior Publication Data
US 2012/0005318 A1    Jan. 5, 2012

(51) Int. Cl.
*G06F 15/16*    (2006.01)
(52) U.S. Cl. ........ 709/221; 709/224; 709/206; 709/223; 709/229; 370/237; 370/231; 370/235; 370/229; 370/230; 726/22; 726/23; 726/11; 726/5
(58) Field of Classification Search .................. 709/221, 709/223, 206, 224, 229
See application file for complete search history.

(56) References Cited

U.S. PATENT DOCUMENTS

| | | | |
|---|---|---|---|
| 5,928,369 A | 7/1999 | Keyser et al. | |
| 7,475,387 B2 | 1/2009 | Chandane | |
| 7,606,229 B1 * | 10/2009 | Foschiano et al. | 370/392 |
| 7,978,607 B1 * | 7/2011 | Halabi et al. | 370/235 |
| 2005/0138463 A1 * | 6/2005 | Bolt et al. | 714/4 |
| 2006/0123226 A1 * | 6/2006 | Kumar et al. | 713/154 |
| 2006/0167871 A1 * | 7/2006 | Sorenson et al. | 707/6 |
| 2007/0223502 A1 * | 9/2007 | Green | 370/401 |
| 2008/0154600 A1 * | 6/2008 | Tian et al. | 704/251 |
| 2009/0228963 A1 * | 9/2009 | Pearce et al. | 726/5 |
| 2010/0050229 A1 * | 2/2010 | Overby, Jr. | 726/1 |
| 2010/0057860 A1 * | 3/2010 | Fry et al. | 709/206 |
| 2010/0216475 A1 * | 8/2010 | Hoole | 455/436 |
| 2011/0235518 A1 * | 9/2011 | Halabi et al. | 370/237 |

OTHER PUBLICATIONS

David A. Wheeler, "Why Open Source Software / Free Software (OSS/FS, FLOSS, or FOSS)? Look at the Numbers!", available at http://www.dwheeler.com/oss_fs_why.html#tco Revised as of Apr. 12, 2007.
Gillen et al., The role of Linux in reducing cost of enterprise computing, IDC white paper, Jan. 2002.
Sadtler et al. WebSphere Application Server V6 Problem Determination for Distributed Platforms. SG24-6798-00, Redbook, Nov. 20, 2005.
Baragoin et al. DB2 Warehouse Management: High Availability and Problem Determination Guide. SG24-6544-00, Redbook, Mar. 22, 2002.
Laadan et al. DejaView: A Personal Virtual Computer Recorder, Jan. 2007.
Wang et al, Peer Pressure for Automatic Troubleshooting, Jun. 29, 2004. Reimer et al. Opening Black Boxes: Using Semantic Information to Combat Virtual Machine Image Sprawl, Jan. 2008.
Concurrent Versions System. http://www.nongnu.org/cvs/, Dec. 3, 2006.
GIT, http://git-scm.com/, Jun. 11, 2009.
IBM Support Assistant. http://www-01.ibm.com/software/support/isa/, Jul. 27, 2007.
U.S. Appl. No. 12/872,095, filed Aug. 31, 2010, titled Modular Cloud Computing System.

* cited by examiner

*Primary Examiner* — Jude Jean Gilles
(74) *Attorney, Agent, or Firm* — Ryan, Mason & Lewis, LLP

(57) ABSTRACT

Techniques for problem determination are provided. The techniques include identifying one or more configuration items in two or more systems connected to one or more networks, performing a comparison of one or more common configuration items from the one or more configuration items in the two or more systems connected to one or more networks, and using the comparison to detect deviation between one or more configuration items of one of the two or more systems and one or more respective configuration items in the other one or more systems.

25 Claims, 6 Drawing Sheets

NETWORK PROBLEM DETERMINATION

FIELD OF THE INVENTION

Embodiments of the invention generally relate to information technology, and, more particularly, to network cloud environments.

BACKGROUND OF THE INVENTION

In many instances, a significant portion of total cost of operation (TCO), which in turn can be five to ten times the purchase price of the system hardware and software, is spent resolving problems or preparing for imminent problems in the system. Hence, the cost of problem determination and resolution (PDR) represents a substantial part of operational costs.

Consequently, making PDR cost effective has posed a challenge in traditional information technology (IT) environments. The IT resources being dedicated to a particular customer and his or her applications lead to a diversity of configuration among IT environments and applications that can make it challenging to programmatically reuse scripts, workflows, lessons learned from one environment to another. This heterogeneity is one aspect of the problem determination and resolution replication issue.

Existing approaches in the area of problem determination and resolution provide methodology restricted to particular products address only potential problems that have been identified in the product pre-production phase and have been categorized in error codes integrated in the product.

SUMMARY OF THE INVENTION

Principles and embodiments of the invention provide techniques for network problem determination. An exemplary method (which may be computer-implemented) for problem determination, according to one aspect of the invention, can include steps of identifying one or more configuration items in two or more systems connected to one or more networks, performing a comparison of one or more common configuration items from the one or more configuration items in the two or more systems connected to one or more networks, and using the comparison to detect deviation between one or more configuration items of one of the two or more systems and one or more respective configuration items in the other one or more systems.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include consensus-based proactive problem determination and resolution in cloud environments. One or more embodiments of the invention include pre-detection of failures of systems connected to one or more networks, as well as incipient failure detection on network cloud environments. Additionally, one or more embodiments of the invention advantageously consider configuration troubleshooting knowledge related to fixing uncategorized failures in a production environment.

The techniques detailed herein also include controlling information technology (IT) resources over a network environment, providing a systematic approach to problem determination resolution (PDR), as well as facilitating a decrease in the cost of detecting system failures. Additionally, one or more embodiments of the invention include facilitating the decrease of the cost of incident and problem management methodology through systematizing existent data, knowledge, and expertise for reusability, as well as the avoidance of cost associated with problem determination by allowing for proactive problem resolution through knowledge based early notification of configuration issues.

As noted herein, the emergence of IT cloud environments brings with it a shift from the traditional heterogeneous environment towards more homogenous ones through resource virtualization, dynamic allocation, image technology. One or more embodiments of the invention including providing a consensus-based PDR process that covers the operations necessary for detecting configuration anomalies in a virtual system and providing assistance to automatically recover from the cause of the problem into a stable state. In one or more embodiments of the invention, for example, the virtual systems considered for PDR are part of a cluster of resources expected to perform similar operations and thus to expose similar configuration. Also, one or more embodiments of the invention can include similar resources in different point of deployment (POD) clouds (for example, in this instance, the customer IT resources), which are expected to perform similar operations for those clouds.

Figure 1:
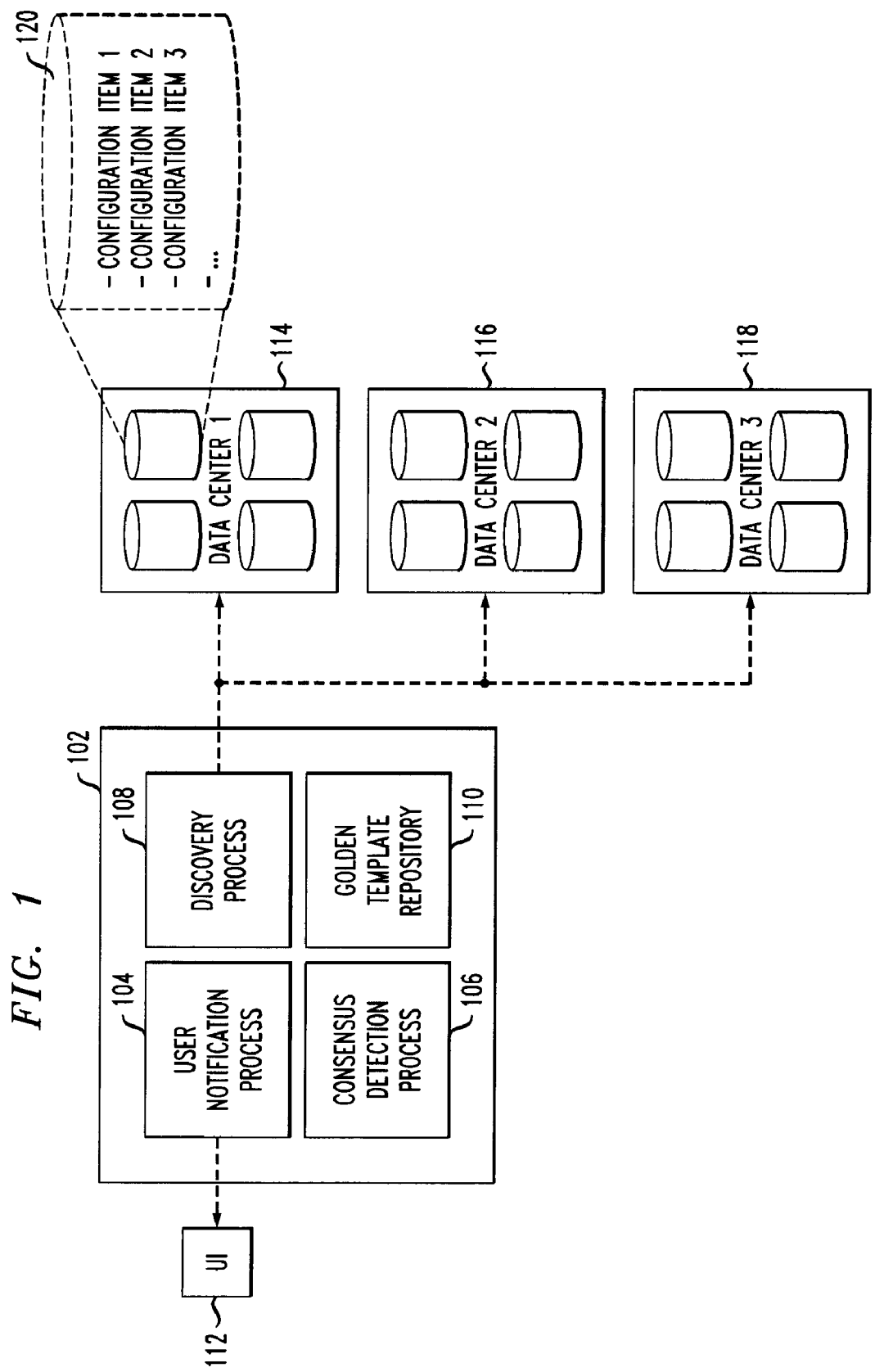
FIG. 1 is a block diagram illustrating an exemplary embodiment, according to an aspect of the invention.

FIG. 1 is a block diagram illustrating an exemplary embodiment, according to an aspect of the invention. By way of illustration, FIG. 1 depicts a cloud operation center 102 that handles the request for any service from users and orchestrates the end-to-end workflow to facilitate that request. The cloud operation center 102 includes a user notification process component 104, a discovery process component 108, a consensus detection process component 106 and a golden template repository component 110. FIG. 1 also depicts a user interface (UI) 112, as well as data centers 114, 116, 118, which can each include configuration item components such as component 120.

As illustrated in FIG. 1, in each data center, a collection of software and hardware systems exists. A discovery process component 108 extracts the relevant configuration items for comparison with those in the golden template (that is, best practices configurations supported by a service provider) repository 110. The consensus detection process component 106 determines if the items are in sync. If not, the notification process component 104 informs the administrator via the UI 112 of a possible impending error.

As described herein, one or more embodiments of the invention relates to proactive failure detection in IT clouds, (that is, early detection of mis-configurations that can lead to issues if not addressed). IT management infrastructure and applications that are similar are identified from a cloud deployment to another, such as, for example, among private clouds dedicated to an industry or the same customer types. As also detailed herein, a discovery process traverses the deployed items and their configurations for each cloud, and the discovered items are matched against a comprehensive cloud configuration and hierarchical configuration golden templates are built for each industry or groups of similar customer types (that is, with similar cloud configurations).

One or more embodiments of the invention can include periodically comparing each cloud's discovered items against the corresponding golden template, level by level in the hierarchy, to detect misalignments. The comparisons can be performed, by way of example, in all aspects, installed software (text comparison), numerical and textual configurations. Additionally, one or more embodiments of the invention include providing a process to fix the issues by realigning to the golden template or updating the golden template. Further, presentation of the early detection of mis-configurations via an interface or graphical user interface (GUI) can be used for discoverability as well.

In the instance, for example, of similar resources expected to perform similar operations in different POD clouds, the first step in the discovery process detailed above (based upon which the hierarchical configuration golden templates are built) has to be performed over all the resources considered for PDR, and not only a couple them. Being in different Clouds, these resources are not expected to be completely identical. The ratio of common configuration items expected to have identical values versus common configuration items expected to differ in value can be used as an indicator whether or not that particular resource is or is not a good candidate for this PDR methodology.

Figure 2:
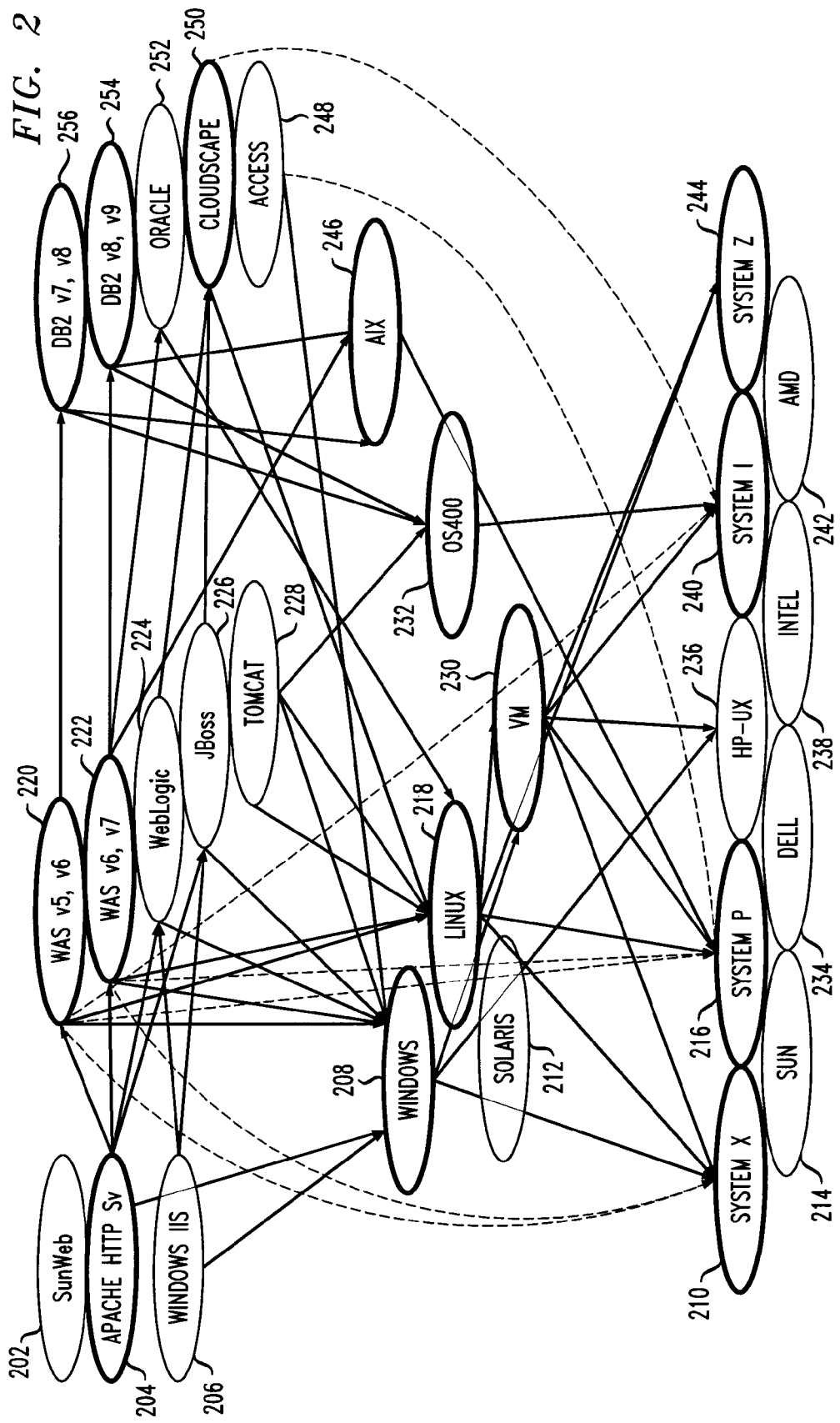
FIG. 2 is a diagram illustrating a data structure defining a hierarchy of configuration items, according to an embodiment of the present invention.

FIG. 2 is a diagram illustrating a data structure defining a hierarchy of configuration items, according to an embodiment of the present invention. By way of illustration, FIG. 2 depicts example configuration items 202, 204, 206, 208, 210, 212, 214, 216, 218, 220, 222, 224, 226, 228, 230, 232, 234, 236, 238, 240, 242, 244, 246, 248, 250, 252, 254 and 256 in a defined hierarchy. As also depicted in FIG. 2, dashed lines indicate cumulative dependencies, such as, for example, random access memory (RAM). For instance, if two applications each require 1 Gb RAM, one or more embodiments of the invention can add 1+1 and provide 2 Gb. Additionally, as depicted in FIG. 2, solid black-lines can indicate, for example, that two applications are dependent on Windows, and they can be installed on the same Win instance. Further depicted in FIG. 2, the heavy ovals (versus the thin ovals) can indicate supported configurations or best practices.

As detailed herein, a golden template stores constraints and dependencies that reflect the best practices configuration templates supported by a specific service provider. By way of example and not limitation, an example of a constraint that reflect best practices configurations can include "Web application server M version a.b.c works with database server N version x.y.z." A special type of configuration constraint can include the classes of equivalence rules that indicate which products provide similar functionality. Software conflicts are another potential type of constraint. The constraints may also include performance and resource utilization rules such as, for example, "For low resource utilization requirements, the application server and the database are to be installed on the same machine." Those skilled in the art will appreciate, however, that these are example constraints only, and that any IT constraints and dependencies may be used without departing from the spirit of the present invention.

Figure 3:
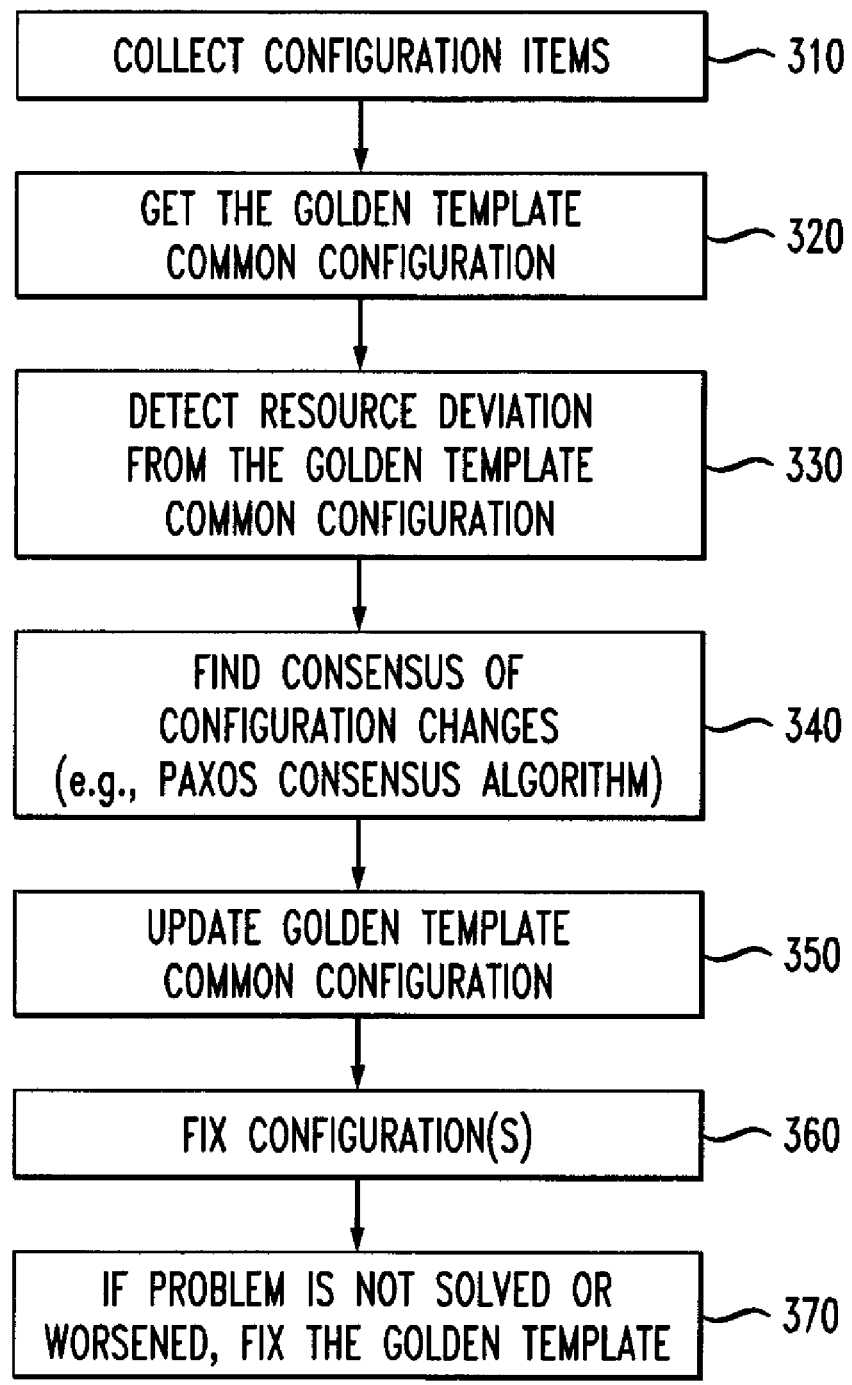
FIG. 3 is a flow diagram illustrating techniques for problem determination and resolution, according to an embodiment of the present invention.

FIG. 3 is a flow diagram illustrating techniques for problem determination and resolution, according to an embodiment of the present invention. Step 310 includes collecting configuration items (for example, from PODs). Step 320 includes obtaining the golden template of common configurations. In a cluster of similar resources operating normally, one or more embodiments of the invention include comparing resources, extracting the common configuration items that have identical values, and storing them as a configuration tree (for example, in extensible markup language (XML) format) in a local repository.

Step 330 includes detecting resource deviation from the golden template configurations. One or more embodiments of the invention include publishing the golden template of common configuration to the cluster resources. On each resource, the golden template of common configuration is compared to the current resource configuration with a high frequency (for example, each few minutes as to make it relevant to a proactive PDR context). Such comparison can be performed, for example, using hash values at different levels in the configuration tree.

Step 340 includes finding a consensus of configuration changes (for example, via the Paxos consensus algorithm). As detailed herein, if differences/deviations are detected, one or more embodiments of the invention will trigger a consensus algorithm to run, comparing the detected differences among a subset of the collected resources. In one or more embodiments of the invention, the subset is bigger than the double of the number of resources found with different configurations.

Step 350 includes updating the golden template of common configuration. If the differences/deviations are consistent among resources, one or more embodiments of the invention infer cluster updates and generate new golden template of common configuration. Step 360 includes fixing configurations. If the differences/deviations are not consistent among resources, one or more embodiments of the invention include notifying an administrator to confirm the update/re-image of the problematic resources with the configuration of the most resources (that is, the collected resources). Further, if the problem is not solved or is worsened, step 370 includes fixing the golden template of common configuration and re-imaging the resources. By way of example, if a configuration parameter has a wrong value in the template, one or more embodiments of the invention include correcting the value and propagating the change to all affected PODs. Also, if an image is available, one or more embodiments of the invention include re-imaging the affected VMs.

Figure 4:
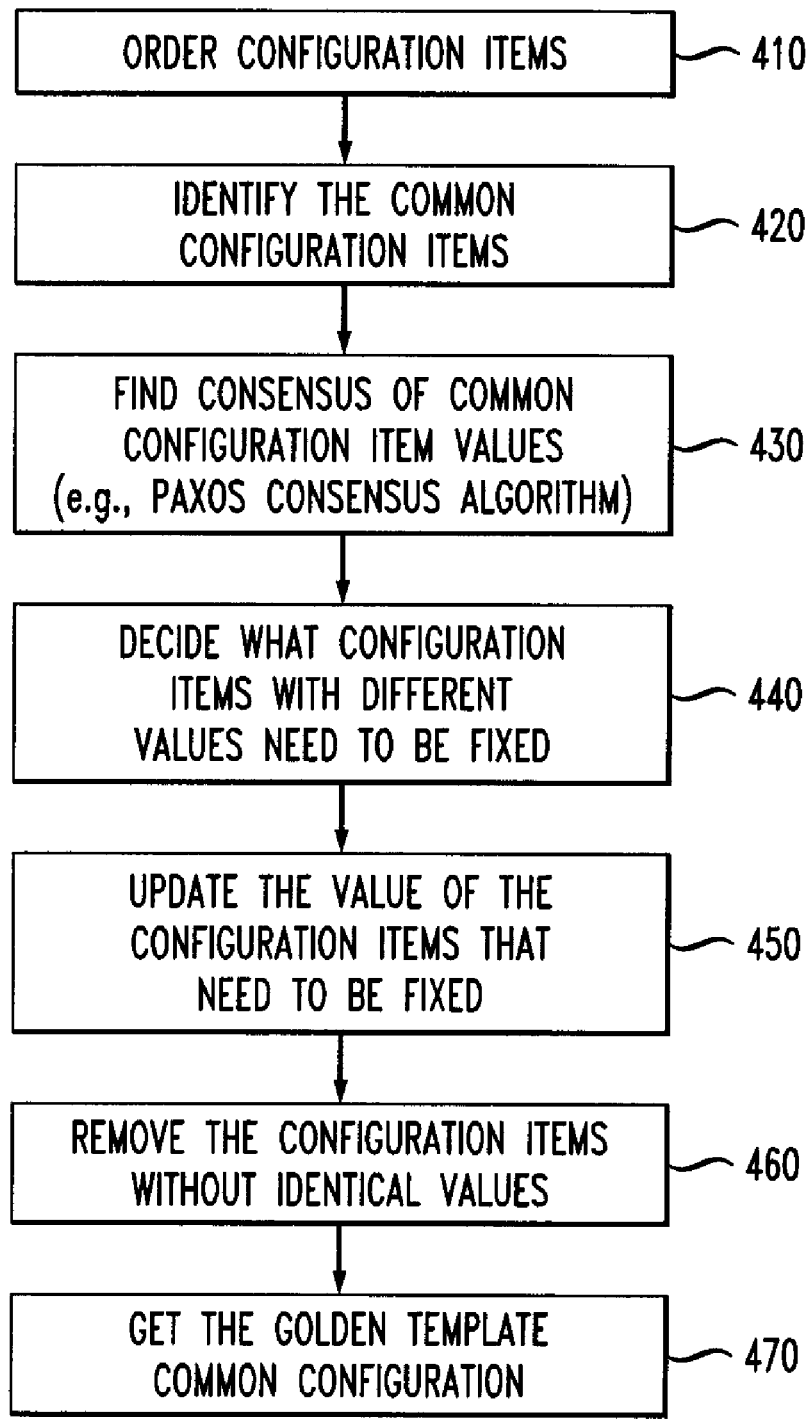
FIG. 4 is a flow diagram illustrating techniques for performing a commonality identification process, according to an embodiment of the present invention.

FIG. 4 is a flow diagram illustrating techniques for performing a commonality identification process, according to an embodiment of the present invention. Step 410 includes ordering configuration items (for example, from PODs). Step 420 includes identifying the common configuration items. Step 430 includes finding a consensus of common configuration item values (for example, via use of the Paxos consensus algorithm). Step 440 includes deciding what configuration items with different values need to be fixed. When differences are detected, one or more embodiments of the invention include triggering a consensus algorithm to run, comparing the detected differences among a subset of resources. Further, in one or more embodiments of the invention, the subset is bigger than the double of the number of resources found with different configurations.

Step 450 includes updating the value of the configuration items that need to be fixed. Step 460 includes removing the configuration items without identical values. Further, step 470 includes obtaining the golden template of common configuration.

Figure 5:
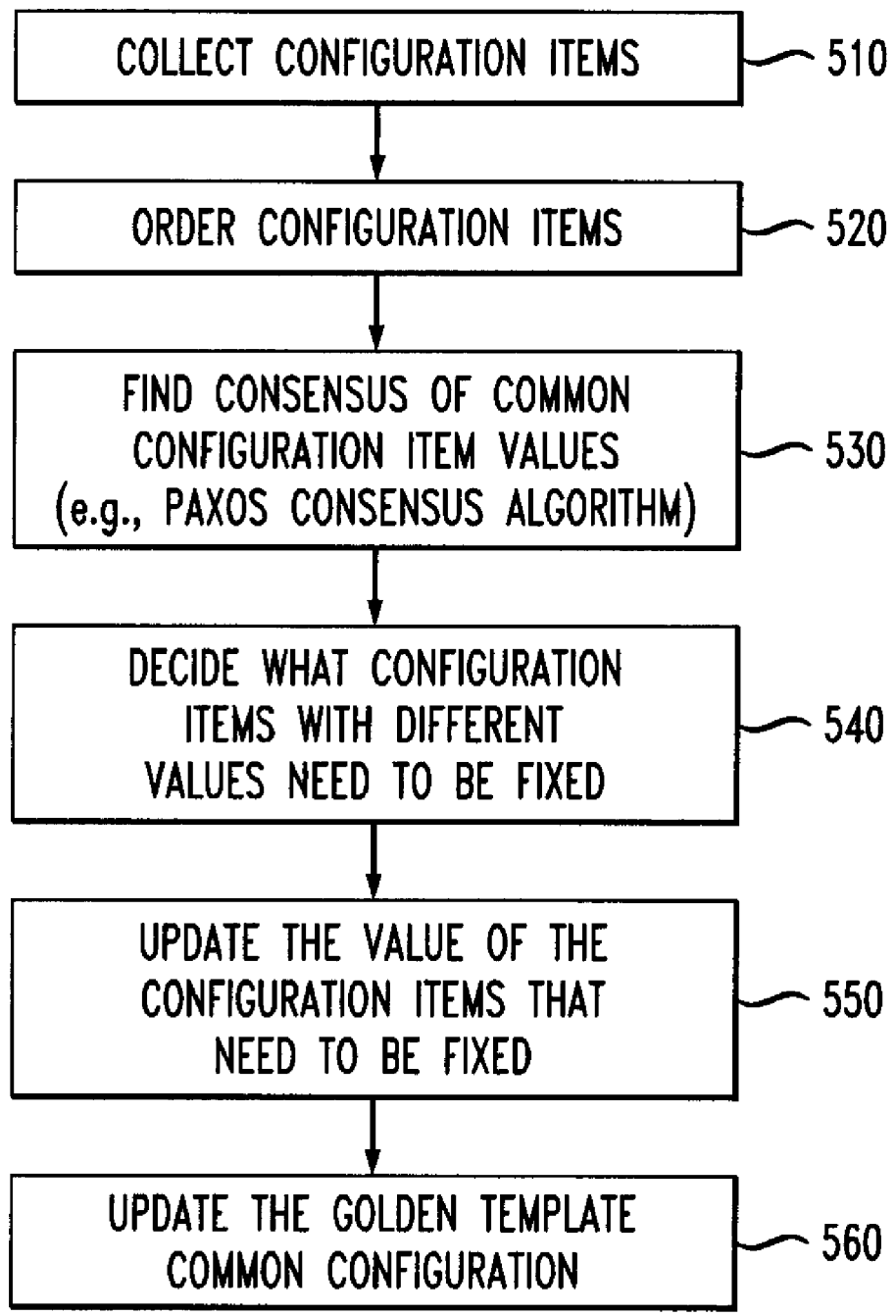
FIG. 5 is a flow diagram illustrating techniques for performing a periodical comparison process, according to an embodiment of the present invention.

FIG. 5 is a flow diagram illustrating techniques for performing a periodical comparison process, according to an embodiment of the present invention. Step 510 includes collecting configuration items. Step 520 includes ordering configuration items. Step 530 includes finding a consensus of common configuration item values (for example, via use of the Paxos consensus algorithm).

Step 540 includes deciding what configuration items with different values need to be fixed. Step 550 includes updating the value of the configuration item values that need to be fixed. Additionally, step 560 includes updating the golden template of common configuration.

Figure 6:
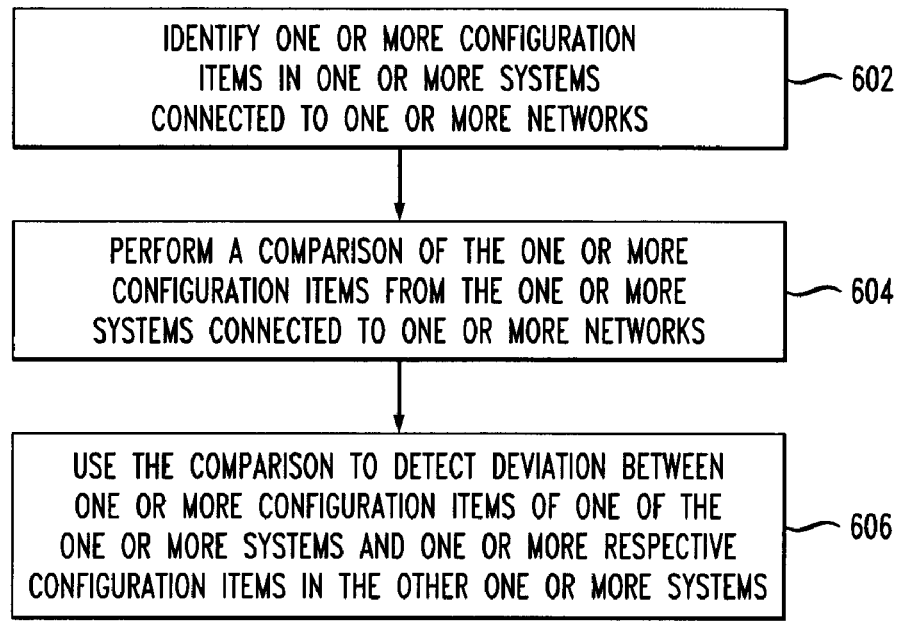
FIG. 6 is a flow diagram illustrating techniques for problem determination, according to an embodiment of the invention.

FIG. 6 is a flow diagram illustrating techniques for problem determination, according to an embodiment of the present invention. Step 602 includes identifying one or more configuration items in two or more systems (for example, similar systems) connected to one or more networks. This step can be carried out, for example, using a discovery process module.

The configuration items can include, for example, virtual machine class properties (such as, for example, CPU specifications, RAM specifications, on/off status, hard drive specifications, etc.), virtual machine operating system properties (such as, for example, name, version, update level, etc.), operating system application properties (such as, for example, name, version, update level, etc.), operating system library properties (such as, for example, name, version, update level, etc.) and application software configurations of one or more application programs running on a respective virtual machine. Also, the one or more configuration items can be organized in a hierarchy.

Step 604 includes performing a comparison of one or more common configuration items from the one or more configuration items in the two or more systems connected to one or more networks (for example, using hash values at different levels in the configuration tree). This step can be carried out, for example, using a consensus detection process module.

Step 606 includes using the comparison to detect deviation between one or more configuration items of one of the two or more systems and one or more respective configuration items in the other one or more systems. This step can be carried out, for example, using a consensus detection process module.

The techniques depicted in FIG. 6 can also include identifying a template of common configurations. The configuration items that are in common with all the similar systems and the configuration item values that are identical for all the similar systems are stored in a template data structure (for example, a golden template of common configurations). Identifying a template of common configurations (for example, in a cluster of similar resources operating normally) can include comparing the systems, extracting common configuration items that have identical values, and storing the common configuration items as a configuration tree (for example, in extensible markup language (XML) format) in a local repository.

Additionally, one or more embodiments of the invention can include detecting deviation between the configuration items from the two or more systems and the template of common configurations. Detecting deviation between the configuration items from the systems and the template of common configurations can include publishing the template of common configuration to one or more points of deployment (which can include, for example, the two or more systems).

The techniques depicted in FIG. 6 can also include determining a consensus of configuration changes (via, for example, use of the Paxos consensus algorithm). Determining a consensus of configuration changes can include running a consensus algorithm comparing detected deviations among a subset of the configuration items. By way of example, in one or more embodiments of the invention, the subset can be bigger than the double of the number of resources found with different configurations.

One or more embodiments of the invention can additionally include generating a new template of common configurations if one or more deviations are consistent among the two or more systems. Also, one or more embodiments of the invention include notifying an administrator to update configuration items with detected deviations if the deviations are not consistent among the two or more systems.

The techniques depicted in FIG. 6 can also include performing a commonality identification process, wherein the commonality identification process determines which of the configuration items are common and identical across all of the systems. Performing a commonality identification process can include the steps of ordering one or more configuration items, identifying one or more common configuration items, finding a consensus of common configuration item values, determining which configuration items with deviating values are to be fixed, updating the value of the configuration items to be fixed, removing configuration items without identical values, and obtaining a template of common configurations.

Additionally, the techniques depicted in FIG. 6 can include performing a periodical comparison process, wherein the periodical comparison process identifies a configuration item on one of the systems that has a value different than a respective identical value. Performing a periodical comparison process can include the steps of collecting one or more configuration items, ordering one or more configuration items, finding a consensus of common configuration item values in the configuration items, determining which configuration items with deviating values are to be fixed, updating the value of the configuration item values to be fixed, and updating a template of common configurations.

One or more embodiments of the invention can also include performing a discovery process, wherein the discovery process discovers one or more configuration items and respective values of the configuration items from all of the two or more systems.

The techniques depicted in FIG. 6 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a user interface module, a user notification process module, a discovery process module, a consensus detection process module and a golden template repository module. The modules can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
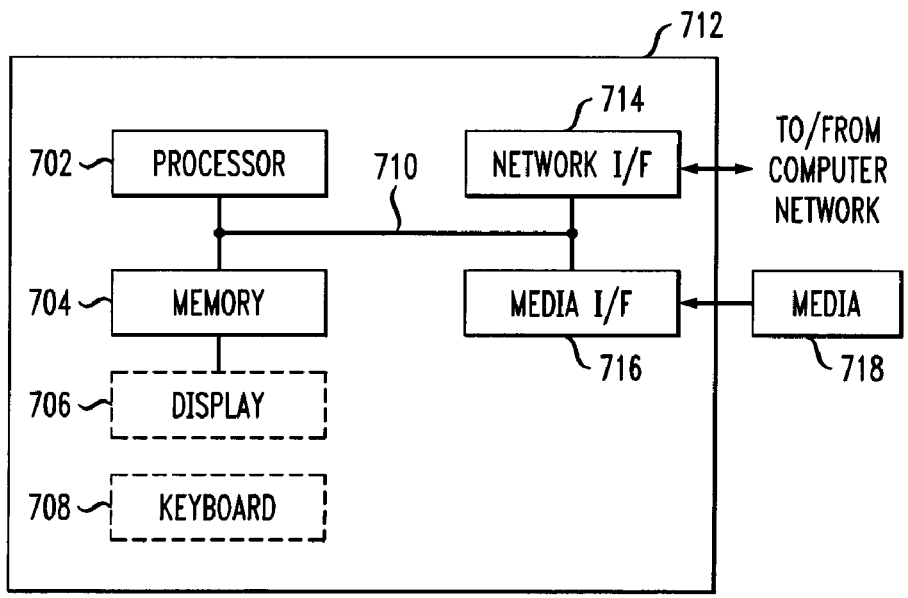
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, considering configuration troubleshooting knowledge related to fixing uncategorized failures in a production environment.

It will be appreciated and should be understood that the exemplary embodiments of the invention described above can be implemented in a number of different fashions.

Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for problem determination, wherein the method comprises:
   identifying one or more configuration items in two or more systems connected to one or more networks;
   performing a comparison of one or more common configuration items from the one or more configuration items in the two or more systems connected to one or more networks; and
   using the comparison to detect deviation between one or more to configuration items of one of the two or more systems and one or more respective configuration items in the other one or more systems.

2. The method of claim 1, further comprising identifying a template of common configurations.

3. The method of claim 2, wherein identifying a template of common configurations comprises comparing the two or more systems, extracting one or more common configuration items that have identical values, and storing the one or more common configuration items as a configuration tree in a local repository.

4. The method of claim 2, further comprising detecting deviation between the one or more configuration items from the two or more systems and the template of common configurations.

5. The method of claim 4, wherein detecting deviation between the one or more configuration items from the two or more systems and the template of common configurations comprises publishing the template of common configuration to one or more points of deployment.

6. The method of claim 1, further comprising determining a consensus of configuration changes.

7. The method of claim 6, wherein determining a consensus of configuration changes comprises running a consensus algorithm comparing one or more detected deviations among a subset of the one or more configuration items.

8. The method of claim 1, further comprising generating a new template of common configurations if one or more deviations are consistent among the two or more systems.

9. The method of claim 1, further comprising notifying an administrator to update one or more configuration items with one or more detected deviations if the one or more deviations are not consistent among the two or more systems.

10. The method of claim 1, wherein the one or more configuration items comprise at least one of one or more virtual machine class properties, one or more virtual machine operating system properties, one or more operating system application properties, one or more operating system library properties and one or more application software configurations of one or more application programs running on a respective virtual machine.

11. The method of claim 1, wherein the one or more configuration items are organized in a hierarchy.

12. The method of claim 1, further comprising performing a commonality identification process, wherein the commonality identification process determines which of the one or more configuration items are common and identical across all of the two or more systems.

13. The method of claim 12, wherein performing a commonality identification process comprises the steps of:
   ordering one or more configuration items;
   identifying one or more common configuration items;
   finding a consensus of common configuration item values;
   determining which configuration items with deviating values are to be fixed;
   updating the value of the configuration items to be fixed;
   removing one or more configuration items without identical values; and
   obtaining a template of common configurations.

14. The method of claim 1, further comprising performing a periodical comparison process, wherein the periodical comparison process identifies a configuration item on one of the two or more systems that has a value different than a respective identical value.

15. The method of claim 14, wherein performing a periodical comparison process comprises the steps of:
   collecting one or more configuration items;
   ordering one or more configuration items;
   finding a consensus of common configuration item values in the one or more configuration items;
   determining which configuration items with deviating values are to be fixed;
   updating the value of the configuration item values to be fixed; and
   updating a template of common configurations.

16. The method of claim 1, further comprising performing a discovery process, wherein the discovery process discovers one or more configuration items and respective values of the one or more configuration items from all of the two or more systems.

17. The method of claim 1, further comprising providing a system, wherein the system comprises one or more distinct software modules, each of the one or more distinct software modules being embodied on a tangible computer-readable recordable storage medium, and wherein the one or more distinct software modules comprise a user interface module, a user notification process module, a discovery process module, a consensus detection process module and a golden template repository module executing on a hardware processor.

18. A computer program product comprising a tangible computer readable recordable storage medium including computer useable program code for problem determination, the computer program product including:
   computer useable program code for identifying one or more configuration items in two or more systems connected to one or more networks;
   computer useable program code for performing a comparison of one or more common configuration items from the one or more configuration items in the two or more systems connected to one or more networks; and
   computer useable program code for using the comparison to detect deviation between one or more configuration items of one of the two or more systems and one or more respective configuration items in the other one or more systems.

19. The computer program product of claim 18, further comprising computer useable program code for identifying a template of common configurations, wherein the computer useable program code for identifying a template of common configurations comprises computer useable program code for comparing the two or more systems, extracting one or more common configuration items that have identical values, and storing the one or more common configuration items as a configuration tree in a local repository.

20. The computer program product of claim 18, further comprising computer useable program code for detecting deviation between the one or more configuration items from the two or more systems and the template of common configurations, wherein the computer useable program code for detecting deviation between the one or more configuration items from the two or more systems and the template of common configurations comprises computer useable program code for publishing the template of common configuration to one or more points of deployment.

21. The computer program product of claim 18, further comprising computer useable program code for notifying an administrator to update one or more configuration items with one or more detected deviations if the one or more deviations are not consistent among the two or more systems.

22. A system for problem determination, comprising:
a memory; and
at least one processor coupled to the memory and operative to:
identify one or more configuration items in two or more systems connected to one or more networks;
perform a comparison of one or more common configuration items from the one or more configuration items in the two or more systems connected to one or more networks; and
use the comparison to detect deviation between one or more configuration items of one of the two or more systems and one or more respective configuration items in the other one or more systems.

23. The system of claim 22, wherein the at least one processor coupled to the memory is further operative to identify a template of common configurations, and wherein the at least one processor coupled to the memory operative to identify a template of common configurations is further operative to compare the two or more systems, extract one or more common configuration items that have identical values, and store the one or more to common configuration items as a configuration tree in a local repository.

24. The system of claim 22, wherein the at least one processor coupled to the memory is further operative to detect deviation between the one or more configuration items from the two or more systems and the template of common configurations, and wherein the at least one processor coupled to the memory operative to detect deviation between the one or more configuration items from the two or more systems and the template of common configurations is further operative to publish the template of common configuration to one or more points of deployment.

25. An apparatus for problem determination, the apparatus comprising:
means for identifying one or more configuration items in two or more systems connected to one or more networks;
means for performing a comparison of one or more common configuration items from the one or more configuration items in the two or more systems connected to one or more networks; and
means for using the comparison to detect deviation between one or more configuration items of one of the two or more systems and one or more respective configuration items in the other one or more systems.

\* \* \* \* \*